No. 704,528. Patented July 15, 1902.
F. A. FERGUSON.
SELF PROPELLING TRUCK AND MOTOR FOR THRESHING MACHINES AND GRAIN SEPARATORS.
(Application filed Apr. 24, 1901.)
(No Model.) 4 Sheets—Sheet 1.

Fig. I.

Witnesses
F. A. Ferguson, Inventor
by C. A. Snow & Co
Attorneys

No. 704,528. Patented July 15, 1902.
F. A. FERGUSON.
SELF PROPELLING TRUCK AND MOTOR FOR THRESHING MACHINES AND GRAIN SEPARATORS.
(Application filed Apr. 24, 1901.)
(No Model.) 4 Sheets—Sheet 4.

Witnesses F. A. Ferguson, Inventor
by C. A. Snow & Co.
Attorneys

UNITED STATES PATENT OFFICE.

FRANK A. FERGUSON, OF BLANCHARD, IOWA.

SELF-PROPELLING TRUCK AND MOTOR FOR THRESHING-MACHINES AND GRAIN-SEPARATORS.

SPECIFICATION forming part of Letters Patent No. 704,528, dated July 15, 1902.

Application filed April 24, 1901. Serial No. 57,282. (No model.)

*To all whom it may concern:*

Be it known that I, FRANK A. FERGUSON, a citizen of the United States, residing at Blanchard, in the county of Page and State of Iowa, have invented a new and useful Self-Propelling Truck and Motor for Threshing-Machines and Grain-Separators, of which the following is a specification.

My invention is an improved self-propelling truck and motor for threshing-machines and grain-separators and the like machinery; and it consists in the peculiar construction and combination of devices hereinafter fully set forth and claimed.

Figure 1:
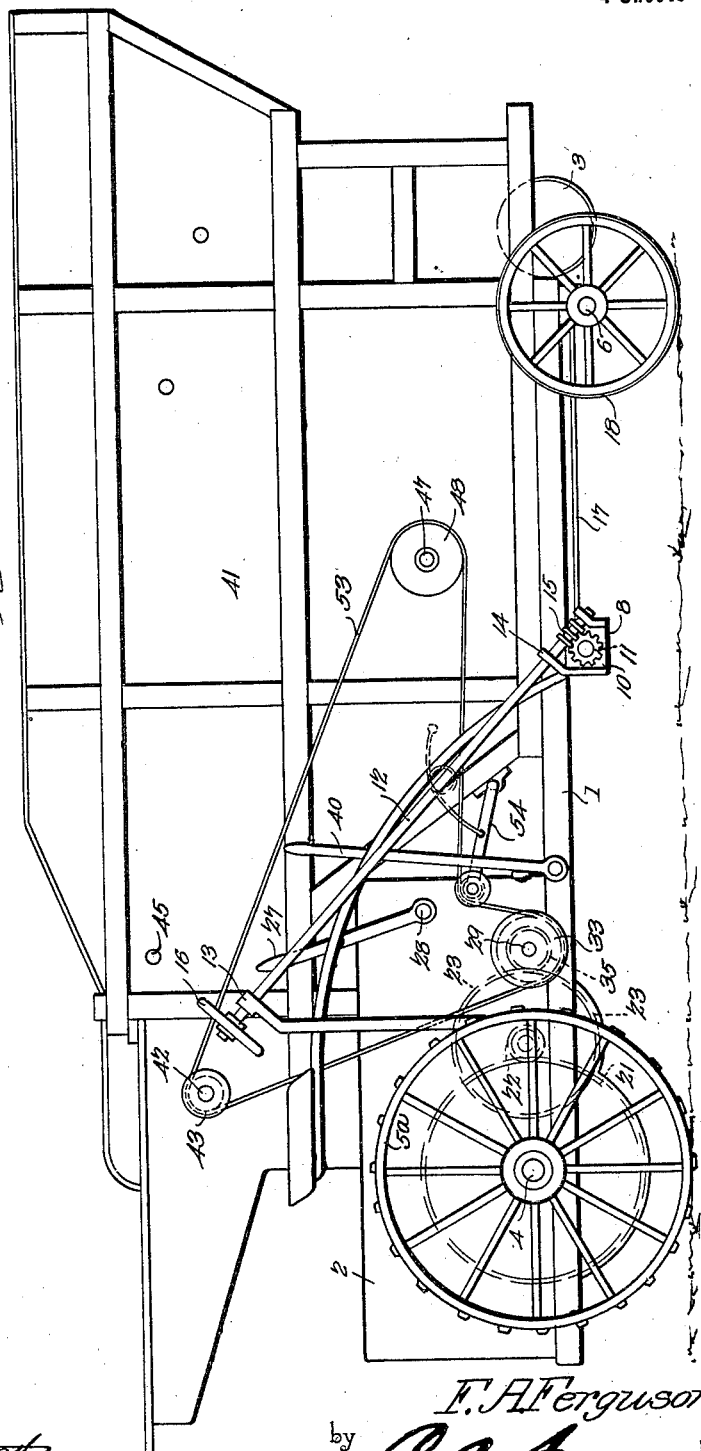
Figure 2:
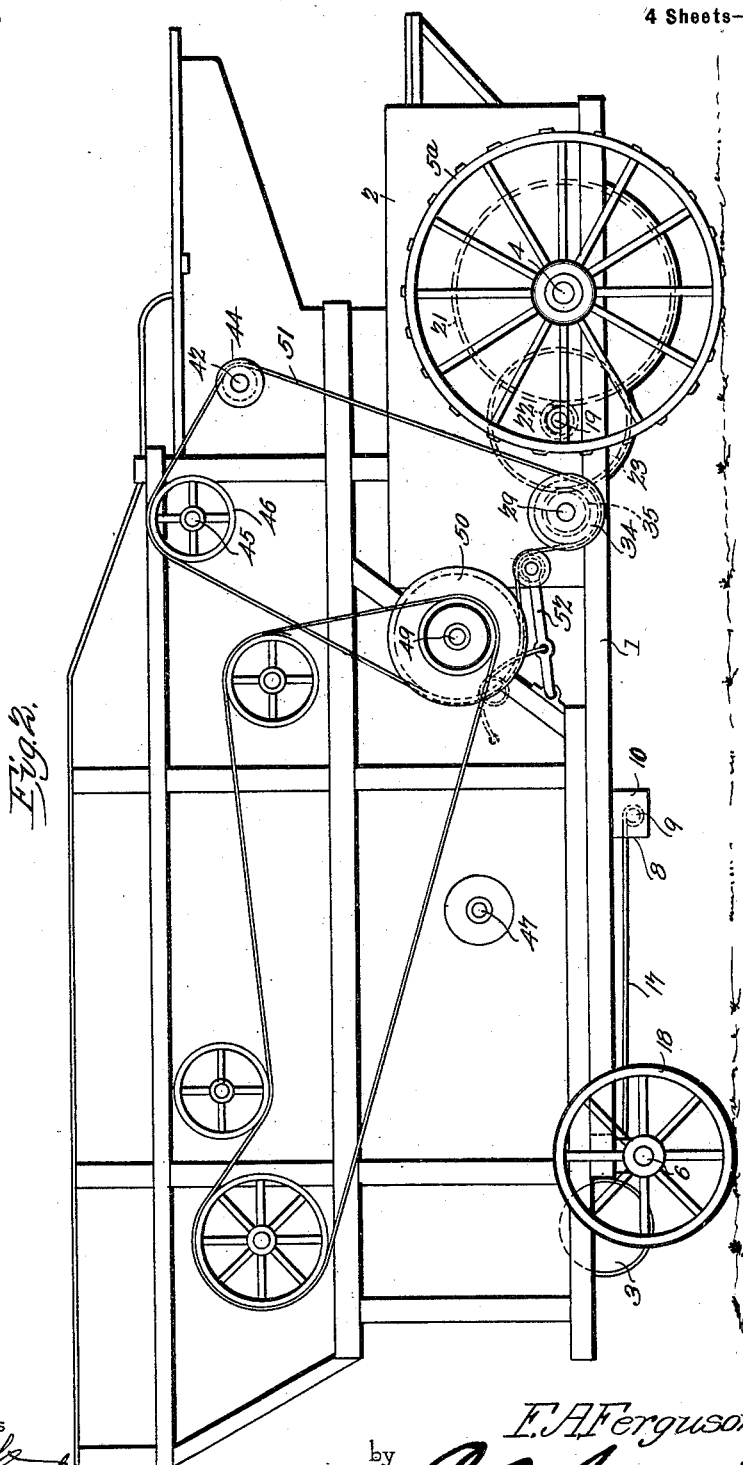
Figure 3:
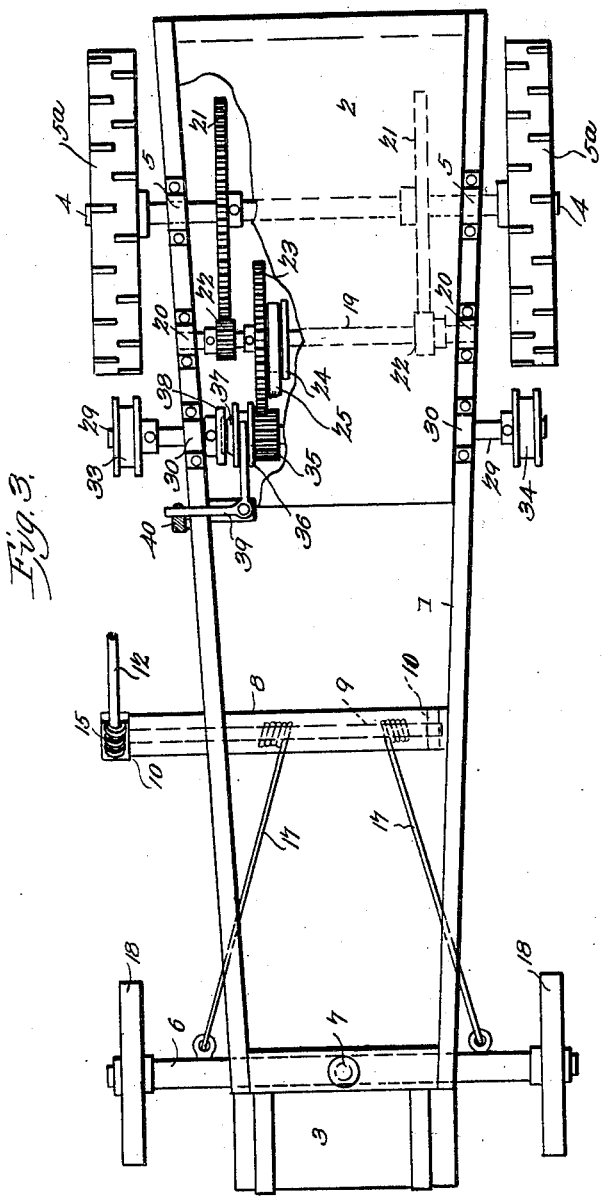
Figure 4:
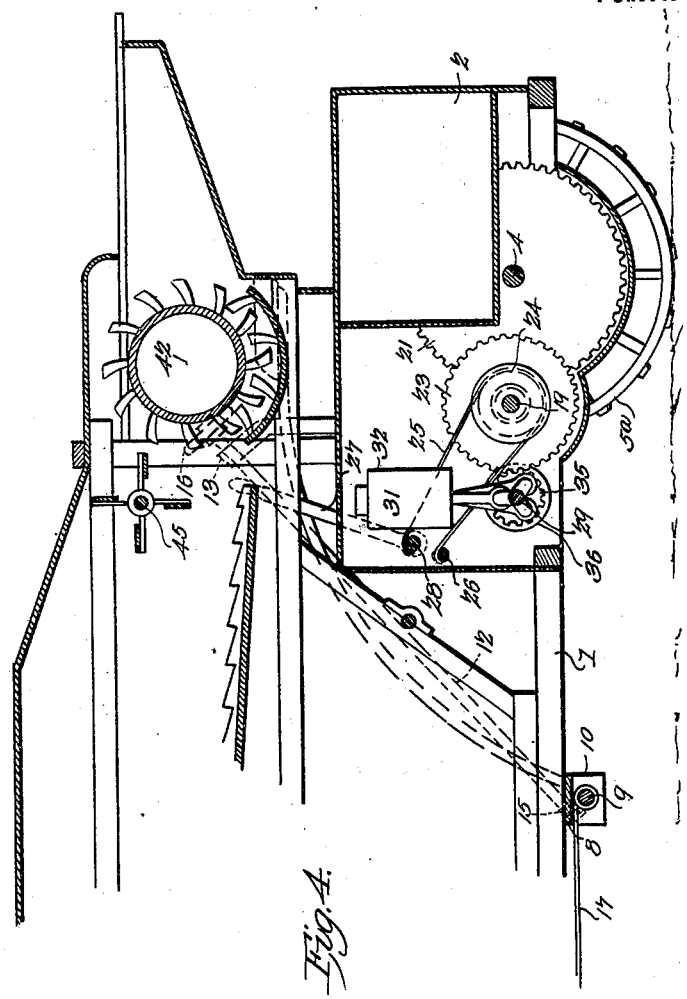

In the accompanying drawings, Figure 1 is a side elevation of a self-propelling truck and motor embodying my improvements, showing the casing of a threshing-machine and grain-separator mounted thereon for operation thereby. Fig. 2 is a similar view showing the reverse side of the truck and threshing-machine and grain-separator. Fig. 3 is a top plan view, partly in section, of my improved truck and motor with the threshing-machine and grain-separator removed therefrom. Fig. 4 is a vertical longitudinal sectional view.

In the embodiment of my invention I provide a suitable reach-frame 1, on the front end of which is a water-tank 2 and to the rear end of which is a tank 3 for gasolene or other suitable liquid hydrocarbon. A traction-shaft 4 is journaled in suitable bearings 5 near the front end of frame 1, and traction-wheels 5ᵃ are revoluble with said shaft. An axle 6 is pivotally mounted, as at 7, under the rear end of frame 1. The latter has a cross-bar 8, one end of which projects beyond one side of said frame. A roller 9 is journaled in suitable bearings 10 under said bar and is provided at one end with a worm-wheel 11. A shaft 12 is disposed in an inclined position beyond one side of frame 1, is journaled in bearings in suitable standards 13 14, and said shaft has near its rear end a worm 15, which engages the worm-wheel 11. At the front upper end of said shaft is a hand wheel or crank 16. Thereby said shaft 12, and hence the roller 9, may be rotated. Suitable cords 17, which are attached to the axle 6 near the ends thereof, are also attached to and reversely wound on the roller 9. Hence by rotating the latter appropriately by means of the manually-operated shaft 12 the axle 6 may be turned in order to guide the truck or machine in any desired direction. On the said axle 6 are supporting-wheels 18.

A counter-shaft 19 is disposed a suitable distance in rear of traction-shaft 4 and is journaled in bearings 20. On said shaft 4 are spur-wheels 21. Said shaft 19 has pinions 22, which engage said spur-gears 21, and said counter-shaft 19 is further provided with a spur-gear 23 and a friction drum or pulley 24. A brake-band 25 is disposed on said drum or pulley 24. One end of said brake-band is connected to any suitable fixed point, as at 26, and the opposite end thereof is connected to a brake-lever 27, as at 28.

An engine-shaft 29 is disposed near the counter-shaft 19 and journaled in suitable bearings, as at 30, said engine-shaft being carried by the frame 1. Any suitable type of engine, preferably a gas-engine, may be employed to rotate said shaft 29. In the drawings the engine is indicated diagrammatically at 31 and is supplied with gasolene from the tank 3. To prevent the cylinders of the engine from becoming overheated, the same are provided with water-jackets, (represented at 32,) and water is supplied thereto from the water-tank 2. At opposite ends of the engine-shaft are pulleys 33 34. A pinion 35 is loose on the engine-shaft, provided on one side with a grooved annulus 36 and a friction-cone 37. Said pinion engages the spur-gear 23 and is wider than said gear and is hence adapted to be shifted longitudinally on the engine-shaft without becoming disconnected from said gear 23. A friction-disk or counter member 38 is fast on the engine-shaft and when engaged by the friction-cone 37 causes power to be communicated through the pinion 35 to the spur-wheel 23, and hence to the shafts 19 and 4, thereby propelling the truck and the machine mounted thereon. The speed of the truck in descending inclines when the engine has been thrown out of operation may be controlled by the friction brake mechanism hereinbefore described, as will be understood. A shifting-arm 39 engages the grooved annulus 36, is connected to a shifting hand-lever 40, and thereby the pinion 35 may be locked to the engine-shaft 29 when it is desired to propel the truck and machine thereon, and the said pinion may be permitted to remain idle on the shaft 29 when the latter is being driven and forms the power-shaft to communicate power to the various elements of the machine carried on the truck. An inclosing casing 41 of suitable construction is provided, which incloses the engine and the gears which connect the same to the traction-shaft. Thereby the engine is protected from dust and dirt.

In the embodiment of my invention here shown a threshing-machine and grain-separator are mounted on the truck-frame 1 and detachable therefrom. The frame and casing 41 of the threshing-machine and grain-separator are of the usual construction and may be of any suitable construction. The cylinder-shaft is indicated at 42 and is provided at each end with a pulley, pulley 43 being on one end thereof and pulley 44 being on the opposite end thereof. The beater-shaft 45 of the machine is provided at one end with a pulley 46. The fan-shaft 47 has at one end a pulley 48. The usual shaft 49, which by the connections usually employed (not here shown) operates the separating mechanism, is provided with a pulley 50 at one end thereof. An endless belt 51, which is normally slack, connects the pulleys 44, 34, 50, and 45. A belt-tightener 52 is provided which engages said belt and by means of which the belt may be tightened to communicate power from one end of the engine-shaft to the separator, beater, and cylinder shafts, as will be understood. An endless belt 53 connects the pulleys 33, 43, and 48. The said belt is normally slack, and a belt-tightener 54 is provided to engage and tighten the same, and thereby cause power to be conveyed from the opposite end of the engine-shaft to the fan-shaft 47 and to one end of the cylinder-shaft 42. Hence the threshing-cylinder is positively driven by power applied to both ends thereof, thereby causing the cylinder to run steadily with increased power and avoiding torsional stress on the cylinder. It will also be understood that power is positively communicated from the engine-shaft to the separator-shaft, so that the latter is driven uniformly and is not affected by the variations in speed of the cylinder.

The frame and casing of the machine may be readily mounted on and detached from the self-propelling truck. While I have here shown and described the self-propelling truck as being equipped with a threshing and separating machine, I do not desire to limit myself in this particular, as any suitable machine, as a fodder-shredder or corn-sheller, may be employed on my improved truck.

Having thus described my invention, I claim—

1. A self-propelling truck having a power-shaft, in combination with the casing of a threshing-machine or the like, having a drive-shaft one or more, the said casing of said machine being detachably mounted on said truck and means to transmit power from said power-shaft to said drive-shaft, substantially as described.

2. In a self-propelling truck having an engine for propelling the same and also for furnishing power to a threshing-machine or the like carried on said truck, the combination of a traction-shaft, a counter-shaft geared thereto, a brake for said counter-shaft, an engine-shaft, a clutch thereon and gearing connecting said engine-shaft with said counter-shaft, the said gearing including a pinion on said engine-shaft adapted by the clutch to be locked to or released from said engine-shaft and means to convey power from the engine-shaft to the said machine-driving element, substantially as described.

3. A self-propelling truck having a power-shaft with pulleys at both ends thereof, in combination with a machine of the class described detachably mounted on said truck and having counter-shafts provided with pulleys, slack belts connecting the pulleys of said counter-shafts to the pulleys of said power-shaft and means for tightening said slack belts, substantially as described.

4. A self-steering supporting-truck for a threshing-machine or the like, having a motor to propel the same, a pivoted axle, means to turn the same, and an inclined, upwardly-extending shaft geared to said axle-turning means and having means whereby it may be manually rotated, substantially as described.

5. In combination with a threshing-machine and grain-separator, having a cylinder, driving-shaft and a driving-shaft for the separating mechanism, each of said shafts having a pulley on the same side of the machine, an engine having a power-shaft provided with a pulley, and an endless belt connecting said pulleys of said power-shaft and cylinder and separating-machine drive-shafts, whereby the separator-machine drive-shaft is driven uniformly and is not affected by the variations in the speed of the cylinder, substantially as described.

In testimony that I claim the foregoing as my own I have hereto affixed my signature in the presence of two witnesses.

FRANK A. FERGUSON.

Witnesses:
WM. M. GILSON,
M. BRYANT.